March 13, 1962 P. R. HASKELL ET AL 3,024,666
CARTRIDGE-POWERED PISTON TYPE TOOL
Original Filed May 10, 1955 5 Sheets-Sheet 1
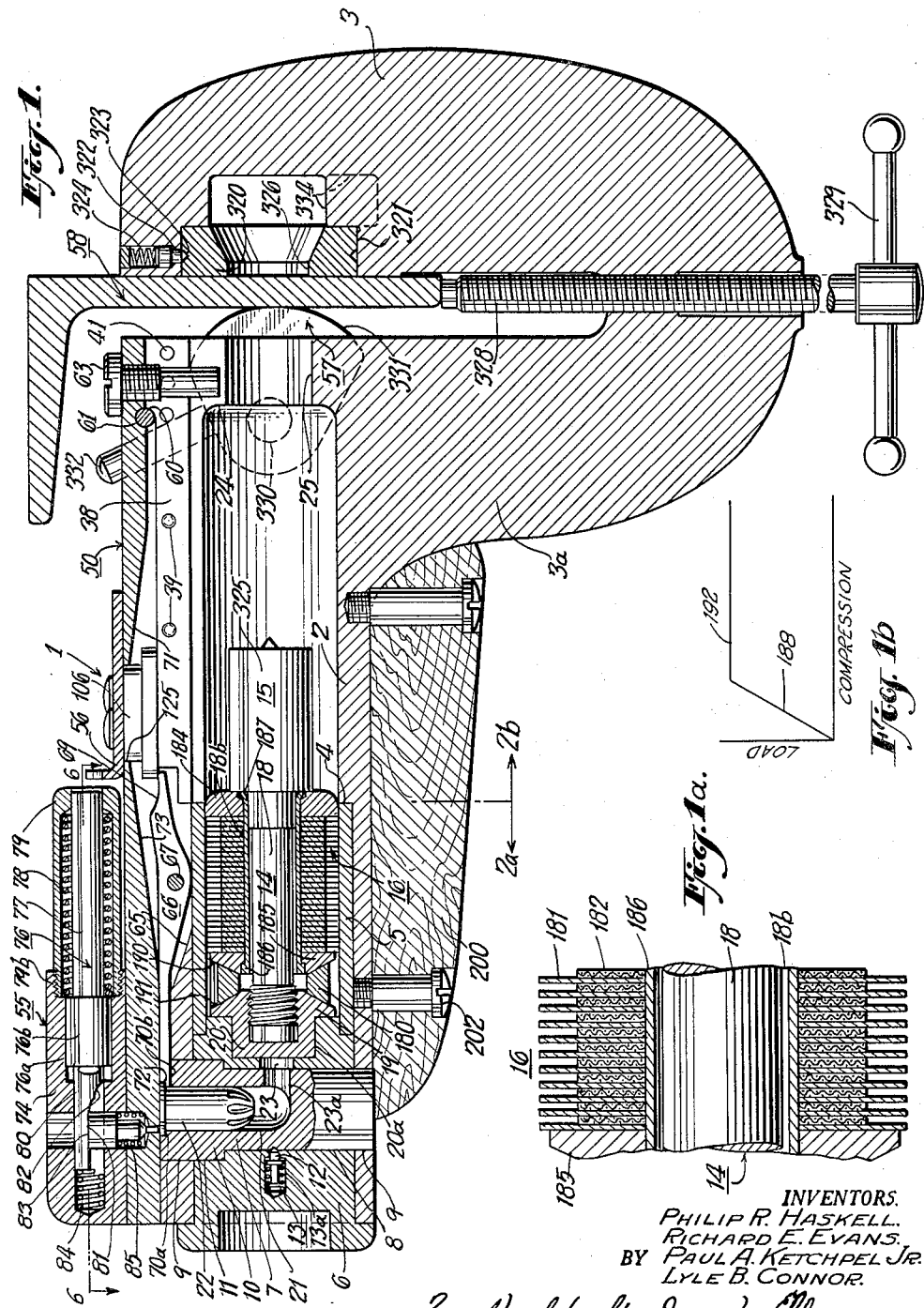
INVENTORS.
PHILIP R. HASKELL.
RICHARD E. EVANS.
BY PAUL A. KETCHPEL JR.
LYLE B. CONNOR.
Ward, Neal, Haselton, Orme & McChannon
ATTORNEYS.

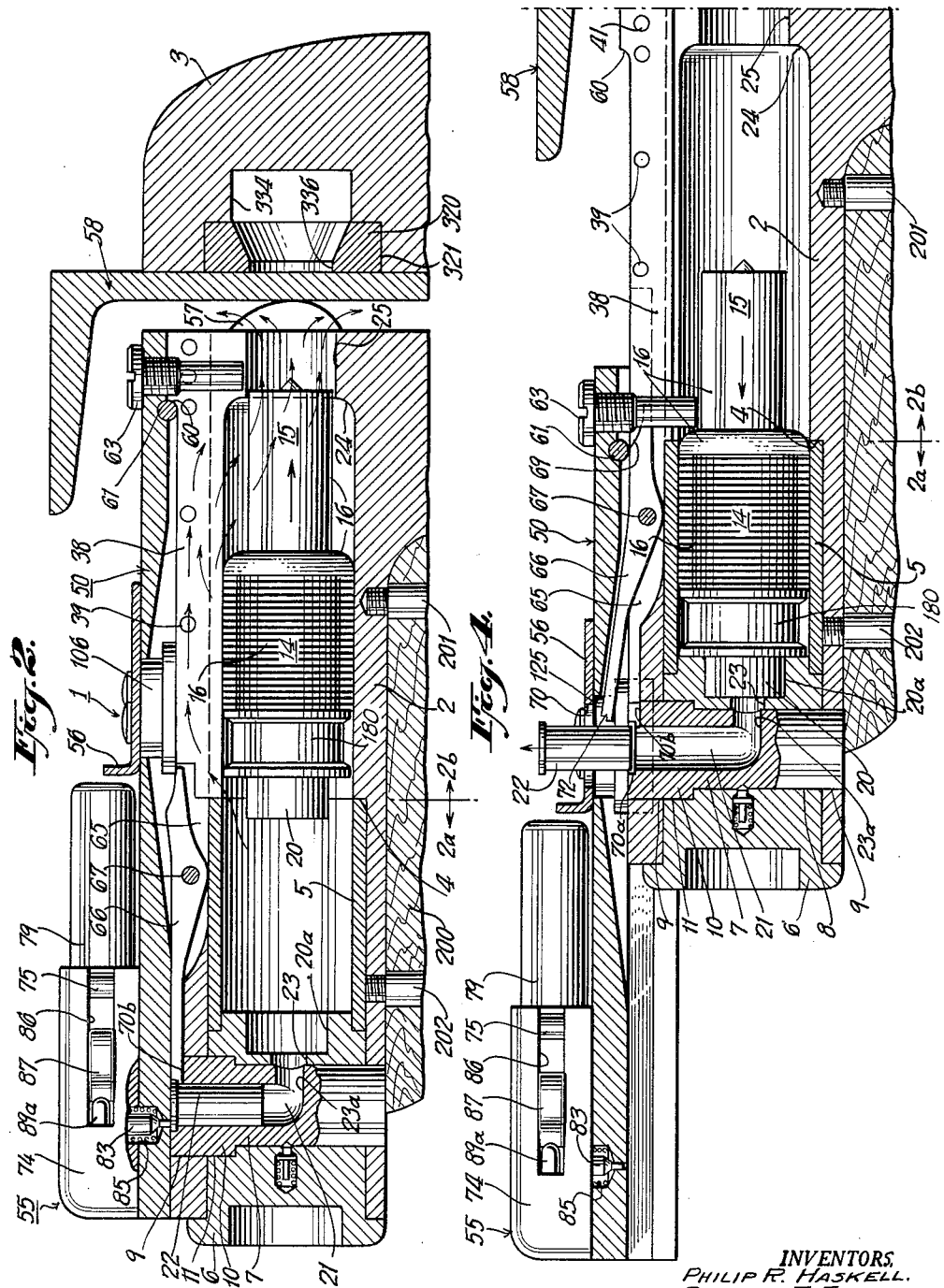

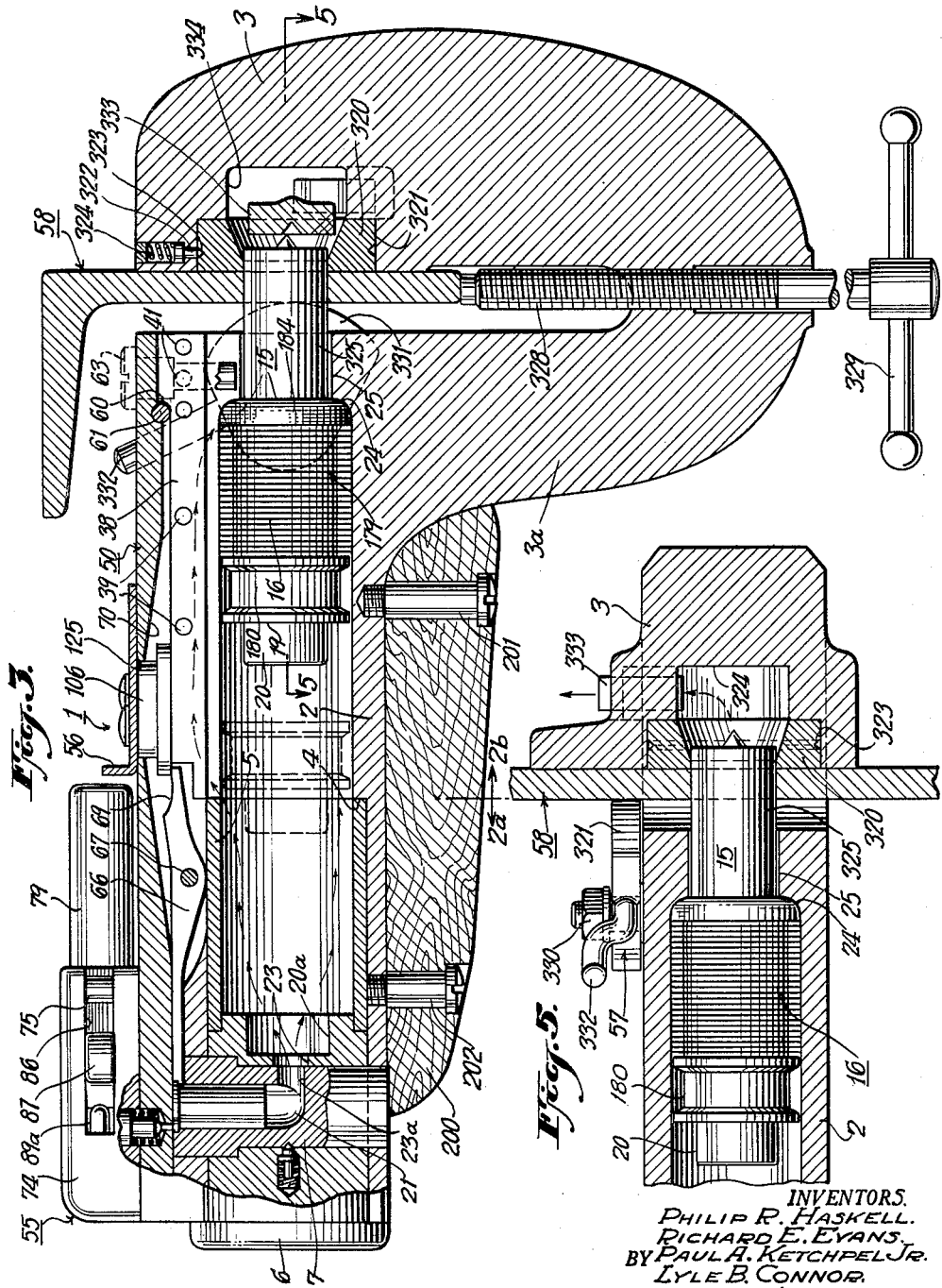

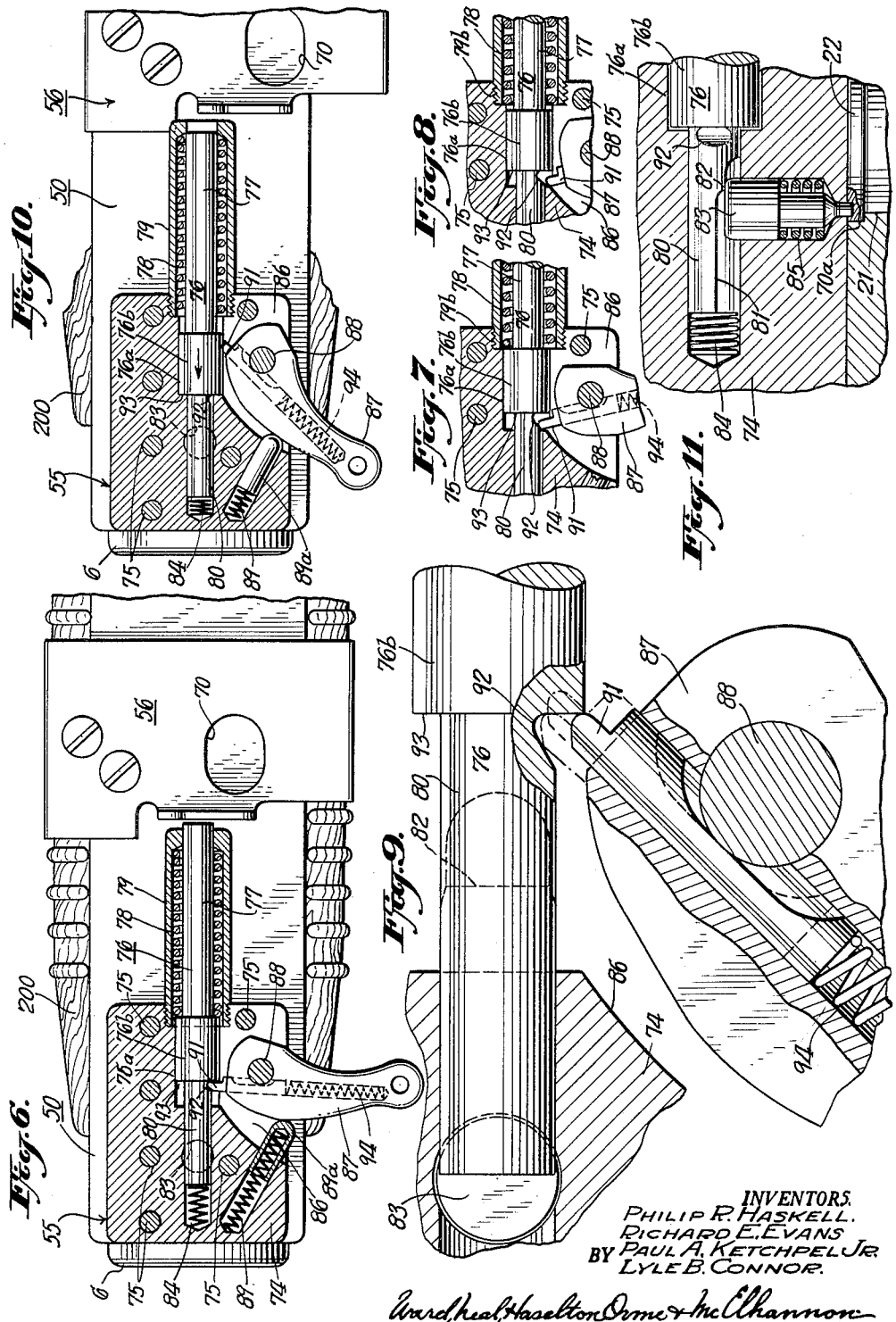

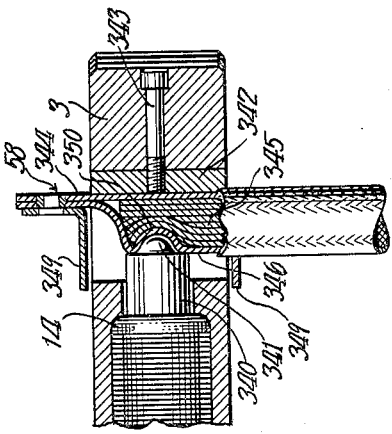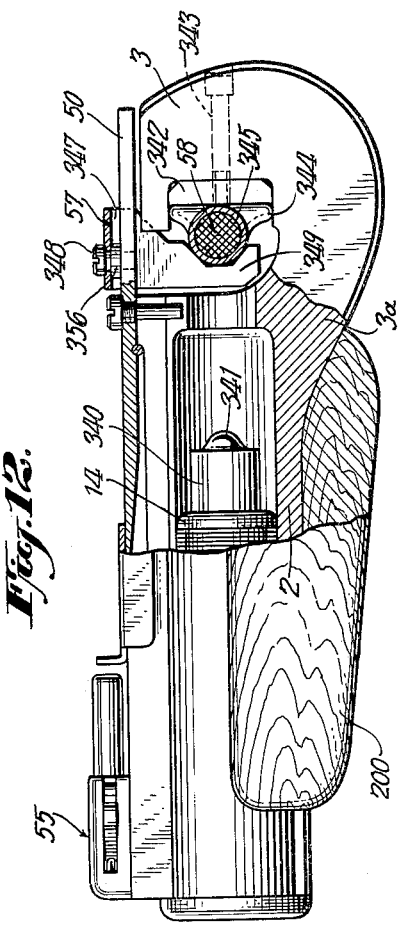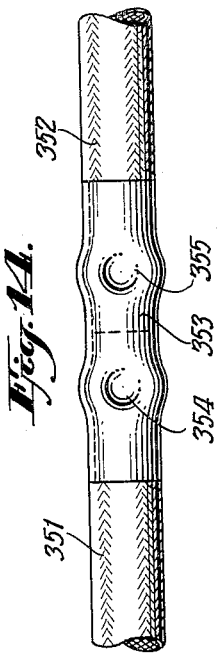

3,024,666
CARTRIDGE-POWERED PISTON TYPE TOOL
Philip R. Haskell, Fairfield, and Richard E. Evans, Southport, Conn., Paul A. Ketchpel, Jr., West Englewood, N.J., and Lyle B. Connor, Juno, Fla., assignors to Remington Arms Company, Inc., Bridgeport, Conn., a corporation of Delaware
Original application May 10, 1955, Ser. No. 507,281. Divided and this application Sept. 9, 1960, Ser. No. 55,098
19 Claims. (Cl. 30—358)

This invention pertains to improvements in explosively actuated or cartridge powered tools, and provides a tool of this type of unique construction which is characterized by extreme compactness, lightness in weight and ease of manipulation with a minimum of effort, and which furthermore is substantially foolproof.

This application is a division of our copending application Serial Number 507,281, filed May 10, 1955.

In its various modifications the tool of the invention is adapted for performing a wide variety of work functions, such as the punching of holes, riveting, the swaging of terminals or sleeves on electrical cables for terminating or uniting the same, the uniting of electrical conduit sections by means of an interposed coupling member, as well as the securing of threaded members on electrical conduit terminations, etc.

The tool of the invention comprises in its essentials and in accordance with a preferred modification, an elongated frame member of steel comprising a tubular or barrel section terminating at one end in a hook-like retainer arm of substantially C-shaped configuration for mounting a work piece to be operated upon. The C-shaped retainer arm of the frame mounts appropriate bushings or dies and clamping means for reception of a work piece. Within the barrel section is slidably displaceable a piston which mounts on its forward end a work tool, such as a hole puncher, cable swager, riveting plunger, etc. The tubular section of the frame is of reduced aperture at its muzzle end to provide a shouldered impact face for arresting forward motion of the piston thereat. The muzzle end is, in addition, appropriately apertured for passage of the work tool therethrough to work engaging position with a work piece held in the retainer arm. A shock absorbing assembly is mounted on the piston for preventing injury to the equipment on impact of the piston with the impact face of the frame, particularly if the tool is fired inadvertently with no workpiece mounted in the retainer arm.

The breech end of the barrel section is closed by means of a barrel plug insertable therein, this plug having a flanged head which overlies the end of the frame thus to prevent incorrect or wrong-end-to assembly. The breech end of the frame as well as the barrel plug are transversely apertured and counterbored for insertion of a relatively massive cartridge chamber plug having an enlarged head which seats in the counterbore, thus again preventing incorrect assembly. This chamber plug contains a bore extending axially through the head for insertion of a cartridge, whereby the tool is cartridge chambered substantially at right angles to the barrel axis, a feature which permits of substantially shortening the effective length of the tool and eliminates the necessity for safety precautions such as otherwise are required in conventional constructions wherein the cartridge chamber is aligned with the barrel. The cartridge chamber has access to the barrel through a sidewall outlet and an aligned bore extending through the end of the barrel plug.

In the firing position the piston is disposed at the breech end of the frame barrel and against the barrel plug in a relatively short barrel sleeve which rests against a shoulder of the frame barrel and is held in position by the barrel plug.

Mounted adjacent the cartridge chamber opening is an elongated ejector, one end of which engages a slot in the upper face of the cartridge chamber plug for assuring proper alignment of the outlet passage thereof with the aligned barrel plug outlet passage aforesaid. This ejector is pivotally mounted on the frame and pivots between cartridge seating and ejecting positions.

The tubular section of the frame is longitudinally slotted along its upper outer sidewalls for slidable reception of a cover having downwardly extending and turned in sidewalls for lockingly engaging these grooves against the explosive action of the tool when fired. This cover, when appropriately assembled on the frame as noted below, is longitudinally displaceable between loading and firing stations. It mounts on its breech end a firing unit including a firing pin which, in the firing position of the cover, is disposed in alignment with the rim of a cartridge inserted in the cartridge chamber for firing the same. The firing unit also includes a firing hammer or bolt which is displaceable longitudinally of the cover. Mounted on the cover adjacent this hammer is a safety locking device, which takes the form of a cross slide member, and which prevents firing of the firing unit except when the cover is adjusted to the firing station and the cross slide adjusted thereat to a firing position.

The underside of the frame mounts an appropriate handle for gripping the tool in one hand while the other hand is employed to manipulate a cross slide safety device and also actuate the trigger of the firing unit.

One of the most important features of the tool is a novel shock absorbing assembly mounted on the piston for preventing injury to the equipment on impact of the piston with the impact face of the frame, particularly if the tool is fired inadvertently with no workpiece mounted in the retainer arm. This shock absorbing mechanism comprises an elastically deformable member which is adapted to absorb the excess kinetic energy for stopping the piston at the impact face after the work tool has performed its function. The other is a plastically deformable member for absorbing such excess kinetic energy as cannot be taken up by the elastically deformable unit, and which comes into play particularly if the tool is fired with no workpiece mounted in the retainer arm. These two units are mounted in axial alignment on the piston so that the elastically deformable shock absorber absorbs the initial impact to its maximum extent whereupon the residue is absorbed by the plastically deformable component. The elastically deformable unit is of laminated construction and in its preferred embodiment, comprises an axially aligned assemblage of metal rings, preferably of steel, interleaved with which are other rings formed of fibrous material impregnated with an elastic polymer, preferably woven nylon fabric impregnated with neoprene.

The rear end of the piston terminates in a protuberance of relatively small bore as compared to the piston proper or barrel which protuberance seats, in the firing position, in a bore of substantially corresponding diameter formed in the inner end of the barrel plug and which has access to the cartridge chamber through the outlet apertures of smaller bore above mentioned. This relatively small bore in which the protuberant piston terminus seats, is of such diameter and length as to assure complete burning of the powder charge before this piston protuberance passes out of the conforming barrel plug bore, and thus assures that the powder charge will not "snuff out."

Having thus described the invention in general terms, reference will now be had for a more detailed descrip- tion of the construction and additional novel features of the invention, to the accompanying drawings wherein:

FIGURE 1 is a longitudinal sectional elevation through the entire tool assembly showing the tool in condition for firing. FIGURE 1a is an enlarged fragmentary sectional view of the piston assembly showing in detail the shock absorbing features of the construction; FIGURE 1b is a graph idealizing the load-compression characteristics of the shock absorbing construction shown in FIGURE 1a.

FIGURES 2 and 3 are views similar to FIGURE 1, but subsequent to firing and showing the advance of the piston and hole puncher assembly in successive stages to the hole punching position.

FIGURE 4 is a partial showing, similar to FIGURE 1, but illustrating the tool in the cartridge ejecting or loading condition.

FIGURE 5 is a fragmentary sectional plan view as taken at 5—5 of FIGURE 3.

FIGURE 6 is a sectional plan view of the firing unit in the firing position as taken at 6—6 of FIGURE 1.

FIGURES 7 and 8 are enlarged, fragmentary sectional details of the FIGURE 6 showing.

FIGURE 9 is an enlarged sectional detail similar to a portion of FIGURE 6, but showing the positioning of the firing mechanism just prior to release of the firing bolt or hammer.

FIGURE 10 is a view similar to FIGURE 6 but showing the positioning of the mechanism immediately following the firing.

FIGURE 11 is an enlarged longitudinal sectional detail showing actuation of the firing pin by the hammer at the instant of firing.

FIGURE 12 is a view in side elevation and partly in section of a further modification of the invention employed for swaging a terminal lug on to the end of an electrical cable; while FIGURE 13 is a sectional plan view of the completed operation.

FIGURE 14 is a plan view illustrating the application of the FIGURE 12 modification to the joining of two cable ends by a coupling sleeve by employment of a double swaging operation.

Referring to FIGURES 1–11, inclusive, of the drawings, the hole punching modification of the invention shown comprises a frame, identified generally by numeral 1, consisting of a tubular barrel portion 2 extending from the breech end 2a at the left to the muzzle end 2b at the right, and a generally C-shaped frame extension comprising a work support 3 in general longitudinal alignment with the barrel portion 2 and connected therewith by a curved shank 3a. The breech end of the barrel portion 2 is of slightly enlarged bore as compared to the muzzle end thereof and thus provides a shoulder 4 against which a relatively short sleeve barrel 5 is held by means of a barrel plug 6 inserted in the breech end of the barrel. The barrel plug is locked in the position shown by a cylindrical cartridge chamber plug 7, which extends transversely of the barrel axis through suitable holes 8, 9 drilled in the barrel plug and the breech end of the barrel portion 2, respectively.

The cartridge chamber plug 7 is provided with an enlarged head 10 which seats in the counterbore 11 of the barrel plug, thus to maintain the assembly locked in position as shown in FIGURE 1.

The mouth of the chamber plug is radially slotted to receive an ejector (to be described), and to locate chamber plug 7 in proper longitudinal and radial position in the bores 8, 9, the cylindrical wall of the plug is notched for reception of a pin 12, backed by a small compression spring 13, mounted in an axial bore 13a of the barrel plug 6.

In the firing position shown in FIGURE 1, a piston 14 is slidably disposed in the sleeve barrel 5, and to which is secured a work impression or punching tool, such as hole punching tool 15, positioned in advance of the piston in the smaller inside diameter region of the barrel portion. Thus, the piston 14 together with work tool 15 comprises a driven assembly.

The work tool 15, shown as a hole puncher, is secured to or formed integral with a shank 18, which extends through a central sleeve member 18b of the piston 14 and is secured to the piston by means of a piston cap 19 threaded on to the breech end of the shank 18.

For purposes above noted, to be explained in detail below, and as shown in FIGURE 1, the breech end of the piston cap 19 terminates in a protuberant extension 20 of considerably smaller diameter than the piston 14, which extension in the action or firing position, rests in a conforming bore 20a drilled in the inner end of the barrel plug 6.

The cartridge plug 7 has formed in the upper portion thereof a bore 21 for insertion of a blank cartridge 22 the cavity below the cartridge forming an explosion chamber which has access through aligned openings in the sidewall of the chamber plug and the forward end of the barrel plug, as at 23a, 23 to the bore 20a of the barrel plug.

Thus when the cartridge is fired, the piston and puncher assembly is impelled progressively forward by the generated power gas as illustrated in FIGURES 2 and 3 until the end of the puncher has advanced to the position shown in FIGURE 2 to punch a hole in, or swage a workpiece 58, as discussed later herein. The piston and puncher assembly is thereupon brought to rest by engagement of the forward end of the piston 14 with a shouldered impact face 24, FIGURES 1–5, of conforming configuration formed at the muzzle end of the tubular barrel section 2, at which the bore is tapered to an outlet passage 25 of relatively small bore through which the explosion gases escape as explained below.

The tubular frame section 2 is longitudinally slotted through its upper surface this slot being offset somewhat from the axis of the frame.

Mounted in this slot and partially closing the same is an insert member 38, as shown, which is positioned against one side of the slot. This insert member is secured to the frame by means of screws, as at 39, which extend through holes in the sidewall of barrel portion 2 and into threaded engagement with the insert member 38, thereby clamping the insert member to the frame. For additional strength the screws 39 are supplemented by dowel pins 41, which also extend as shown, through the sidewall of the barrel section 2 and into suitable apertures provided in the insert member 38, these dowels frictionally engaging the frame and insert member in a tight fit. The slot is wider than the member 38 for purposes to be described.

The frame 1 is provided with a cover or carriage 50 having in end view a relatively flat C-shaped configuration, with turned in lower lateral edges. The barrel section 2 is correspondingly grooved along the upper edges of its opposite outer sidewalls whereby the cover may be slid endwise onto the frame in vertically locking engagement therewith.

Mounted on the breech end of the cover is the firing unit 55, FIGURES 1–4 and 6–12. Mounted adjacent thereto is a cross slide protective device 56 which is transversely adjustable to locking, ejecting and firing positions, and which prevents firing except when adjusted to the position last mentioned, as more fully described, for example, in application Serial Number 507,281, filed May 10, 1955, of which this application is a division.

Mounted on the muzzle end of the frame is a clamping device 57 which clamps the work piece 58, in which a hole is to be punched in the C terminus or work support 3 of the frame. The work clamping device may have modified forms according to the configuration of the workpiece, or the operation thereon to be performed, as will become apparent.

For returning the piston 14 from the impact face 24 of the barrel portion 2, against which the piston rests after firing as above explained, a piston return bolt 63 is tapped vertically through the cover as shown in FIGURES 2, 4 and 12, with the lower end of this bolt projecting into the width of the aforementioned longitudinal slot of the barrel alongside the member 38 and for a sufficient depth as shown in the several figures of the drawings to engage the piston as the cover 50 is displaced to the left from its firing position of FIGURES 1–3, to its cartridge ejecting position of FIGURE 4. It will be noted, referring to FIGURES 1, 2 and 12, that the slot extends at the muzzle end of the barrel portion 2 beyond the piston impact face 24, and is thus protected from impact by the piston even if the shoulder 24 is set back by repeated impact.

Referring more particularly to FIGURES 1–4, a shallow axially extending slot 65, is provided in the upper face of the barrel section 2 near the breech end, in which is mounted an elongated cartridge ejector 66, which pivots on a pin 67 retained in a transverse bore of the frame. The ejector 66 is actuated by displacement of the cover 50 as follows: As the cover is retracted from the firing position of FIGURE 1 to the cartridge ejecting position of FIGURE 4, a transversely extending pin 61 mounted on the under side of the cover engages a concave cam face 69 of the ejector and rotates it clockwise to the canted position shown in FIGURE 4 to eject the cartridge shell 22 through an opening 70 formed in the cross slide 56. The under face of the frame cover 50 is provided with a sloping ramp, as at 71, to permit of this actuation of the ejector. With the cover in the position of FIGURE 4, a new cartridge may be inserted through the cross slide opening 70, until the rim thereof engages the cartridge ejector end 72 of the ejector, whereupon the frame cover 50 is returned to the position of FIGURE 1. As the cover is thus moved into position a second sloping ramp 73 provided on the opposite under side of the cover engages the rim of the cartridge and seats it in the cartridge chamber cavity 21 with the shell rim flush with the upper edge of the cavity as shown in FIGURE 1, while at the same time returning the ejector 66 to the cartridge seating position of FIGURE 1 as the frame cover pin 61 rides off the cam face 69. In order to provide for seating of both the cartridge shell 22 and the ejector 66 flush with the upper surface of the chamber plug 7, this surface is peripherally recessed, as at 70a and radially slotted, as at 70b, FIGURE 4, appropriately to seat the shell rim and ejector, respectively.

Referring to FIGURES 1 and 6–11, inclusive, the firing unit 55 comprises a housing 74 secured to the frame cover 50 by means of screws 75. The housing is drilled for axially displaceable reception of a firing bolt or hammer 76 having an intermediate portion 76b of enlarged diameter which is slidably displaceable in the frame bore 76a. From one end of intermediate portion 76b there extends a hammer terminus 77 of smaller diameter which is sleeved through a hammer spring 78 housed in an open-ended sleeve-like retainer 79, the inner end of which is threaded to the housing as at 79b. From the opposite end of the enlarged hammer portion 76b there extends a second hammer terminus 80 having a flat under face 81, FIGURE 11, which terminates adjacent the enlarged hammer portion 76b in a stepped cam face 82 for actuating a firing pin 83 in the manner illustrated in FIGURE 11.

As shown in FIGURE 1, the flat under face 81 of the terminus 80 normally bears against the enlarged head of the firing pin 83, which latter is positioned in a bore extending through the housing 74 and into the frame cover 50.

The housing 74 also mounts in a laterally extending slot 86 thereof, FGURE 6, a trigger 87, which projects horizontally from the housing, FIGURES 6–10, inclusive, the trigger being pivotally mounted on a pin 88 extending through the housing 74 and spanning the slot 86. The trigger is normally maintained in the position of FIGURE 7 by a compression spring 89, FIGURE 6, disposed in a bore of the housing. Slidably mounted in a bore of the trigger is a sear 91 having a narrowed, finger-like upper end which normally engages a notch 92 in the side of hammer terminus 80 with a slight clearance as shown in FIGURE 7.

Referring to FIGURES 6–10, inclusive, as the trigger is gripped and rotated clockwise about its pivot point 88, against the restoring action of the compression spring 89, the upper end of the sear 91 engages the hammer shoulder 93, formed by enlarged intermediate portion 76b, and forces the hammer to the right against the compressive restoring action of the spring 78, until the position assumed is about that shown in FIGURE 9, at which point the hammer shoulder 93 overrides the rounded upper end of the sear 91 and thus depresses the sear against the restoring action of the sear spring 94, thereby permitting the bolt to be snapped smartly to the left by the restoring action of the hammer spring 78, in the manner shown in FIGURE 10. As the hammer is thus snapped to the left, the flat under face 81 of the hammer terminus 80 rides along the head of the firing pin 83 until the firing pin is engaged by the camming surface 82 formed on terminus 80 which abruptly depresses the firing pin to fire the cartridge in the manner shown in FIGURE 11. Overcarry of the hammer 76 compresses a hammer return spring 84, as shown in FIGURE 10, which immediately restores the hammer to the position of FIGURE 7, whereupon the momentarily compressed firing pin spring 85 returns the firing pin 83 to the position of FIGURE 1, in engagement with the flat under face 81 of the hammer terminus 80.

In firing the tool, and to insure that the work is punched completely through, or properly swaged, etc., it is necessary to impart to the piston and blade assembly an excess of say 25% of the energy actually required to punch or swage the work or to perform other operations heretofore outlined, and, to stop the movement of the piston and tool assembly after its work is completed, a buffer is associated with this assembly. In a preferred form of the invention, this buffer comprises two elements, the first being a stack of radially elastically deformable members and the second a "ring spring" type of assembly comprising one or more members which are radially elastically deformed and under excessive stress undergo a plastic deformation. Such excessive stress may be applied when the tool is inadvertently fired without a workpiece in place. Under these conditions the buffer assembly must absorb and dissipate from the tool system the entire kinetic energy of the piston and tool element assembly, there being no other resistance to the forward movement of this assembly. The construction of the tool may be such that plastic deformation of the ring spring disables the tool, in a manner to be described, both indicating that the tool has been fired without a workpiece in place and necessitating replacement of the plastically deformable ring.

As shown particularly in FIGURES 1 and 1a of the drawings, the elastically deformable shock absorbing component is identified generally by numeral 16 and the elastically and plastically deformable member by numeral 180. The function of the elastically deformable shock absorbing component 16 is to absorb the excess kinetic energy of the piston, over and above that required to punch a hole in, or swage the workpiece 58 when the tool is fired and the piston impelled thereafter against the impact surface 24 of the frame. The function of the plastically deformable member 180 is to absorb and dissipate from the tool system the excess kinetic energy of the piston on firing, which is not taken up in punching or swaging the workpiece, and in elastic deformation of the shock absorbing member 16, or which is not taken up by the shock absorbing member 16 alone such as would be necessary, for example, if the tool is inadvertently fired with no workpiece in the retainer arm.

In order for the elastically deformable shock absorbing component 16 satisfactorily to perform its function above stated, it must be designed to meet two rigid requirements. First, the compression modulus of elasticity of this member must be such as to decelerate the piston without exceeding the tensile strength of the projecting tool element. In this connection it will be observed that upon impact of the piston against the frame impact face 24, tending abruptly to stop the piston, the inertia of the tool element places the same under tension so that if the piston is stopped too abruptly, the tool element will fail in tension. Therefore the shock absorbing component 16 must have a modulus of elasticity which is sufficiently low as to decelerate the piston at a rate sufficiently low that the tensile strength of the plunger tool element is not exceeded. The second requirement which the shock absorbing component 16 must meet is that it must be capable of supporting a compression load equal to the tensile strength of the tool element. This is explainable as follows: As the front face of the piston impacts the frame impact face 24, the shock absorbing component becomes analogous to a compression spring, the rear end of which is connected to, and compressed by, the piston cap 19 threaded onto the terminus of the tool shank 18. The momentum of the tool element is thus resisted by the force exerted by the spring as it is compressed. If this spring has too high a compression modulus, the tool element will fail in tension. Metal springs, even in coiled forms of low modulus, have nevertheless too high a compression modulus, and, being made of metal, a shock wave is built up that outraces the load velocity and "sets" the spring. On the other hand, solid plastics have too high a compression modulus, and, in addition, cannot withstand the compressive forces which their high modulus quickly produces. For example, leather approximates a satisfactory modulus, but fails in compression loading during repeated cycles, because its outer tough fibers break loose from their supporting matrix. Rubber and rubber-like material, including the synthetic rubbers such as neoprene, display a compression modulus somewhat under that of leather, so that considerably more stroke is required to store the same energy. While rubber and equivalent materials can withstand heavy loading with elastic recovery, they require support within a container both to raise their natural modulus and to prevent shredding failure under load. As thus compressed in a container, for example, in a steel sleeve, rubber behaves like an incompressible fluid, exerting tremendous hydraulic pressure on the surrounding container. The strength of the retainer thus required cannot be provided in a tool of reasonable size.

In accordance with one aspect of the present invention, this problem is successfully solved in a compact structure by making the elastically deformable component 16 of a laminated construction and consisting of a series of axially aligned metal rings 181, such as steel shims, which are interleaved with other rings 182 formed of woven fabric, preferably woven nylon fibers, which are impregnated with an elastic polymer, preferably neoprene. This laminated arrangement is assembled, in axial alignment as shown on the steel assembly tube 18b between an impact plate 184 mounted on the forward end of the assembly tube and an annular spacer member or backing plate 185 assembled on the rear end of the assembly tube. To facilitate this assembly, the assembly tube is formed with a flanged terminus 186 at its rear or left end in the drawing and the backing plate 185 is formed with a conforming axial counterbore, which seats against this shoulder. The assembly tube at its opposite end is crimped up against the impact plate 184 as at 187, thus to lock the entire assembly together.

In this assembly, in the elastic polymer-impregnated fabric rings 182, such as the neoprene impregnated woven nylon fibers, the fibers act as stay bolts to hold the elastic polymer or neoprene from expanding, and thus absorb the lateral strain on these rings resulting from impact of the piston against the frame impact face 24. Neoprene has been found to be a convenient elastic binder for nylon fibers, and thus facilitates the establishment of a synthetic modulus of elasticity which neither the nylon alone nor the neoprene alone can possess. The surface of the steel shims separating the layers of impregnated fabric are preferably roughened, as by sand-blasting. These shims frictionally support the fabric layers, giving added strength and retarding radial expansion; their friction against the fabric also dissipates a substantial amount of energy. When, as illustrated, the plastically deformable member 180 is used in conjunction with the elastically deformable component 16, the latter is of such length and construction as to sustain without plastic flow a compression substantially equal to that which will initiate elastic deformation of the member 180.

Referring to FIG. 1b, by appropriately dimensioning or apportioning the number of elastic polymer impregnated fabric rings 182 in relation to the metal rings 181, the modulus of elasticity 188 of the elastically deformable component 16, may be sloped as desired within limits, thus to adjust the deceleration of the piston in accordance with the requirements above stated.

Because of the requirement that the piston weight be minimized, the amount of elastic shock absorption that can be built into the shock absorbing component 16, is limited, and the excess must be taken up by the plastically deformable member 180, both as regards excess kinetic energy resulting from the hole punching or cable swaging operation, and more particularly as regards the excess kinetic energy resulting from inadvertent firing of the tool with no workpiece mounted in the retaining arm. This latter is strictly a protective feature to prevent injury to the piston and the tool itself resulting from such inadvertent firing. To this end the plastically deformable member 180 comprises a ring made of a malleable metal like aluminum or an aluminum alloy of such dimensions that it will fail in compression before the other tool components will fail in tension. That is to say, the compression strength of the plastically deformable member 180 must be substantially less than the tensile strength of the tool frame, punching or swaging element and piston. It will be noted in this connection that when the piston impacts the frame impact face 24, the tubular portion of the frame is placed under tension. Likewise, the punching or swaging element is placed under tension due to its inertia. As shown in FIGURE 1, the plastically deformable member 180 of malleable metal is of trapezium configuration, as viewed in axial section, and is mounted between the backing plate 185 and the piston cap 19, both of which are made of a metal having a high elastic limit, such as steel. The abutting surfaces 190, 191, between the plastically deformable member 180 and the adjacent steel backing plate and piston cap members 185, 19, are preferably sloped in accordance with the minimum slope or friction angle of the contiguous metals, i.e., aluminum vs. steel in the preferred modification as above mentioned, thus to enhance the energy absorption by the malleable metal plastically deformable member 180 as the latter is plastically deformed by compression. Thus the camming angles of the sloped surfaces 190, 191, approximate the friction angles between the contacting metal surfaces, so that the yield strength of the plastically deformable member 180, is mechanically increased by the friction. The plastically deformable member 180 shown, approximates a rectangular stress-strain diagram for maximum efficiency of energy dissipation as a function of piston stroke. The maximum force developed thereon accordingly never exceeds a value exceeding the tensile strength of the tool element and shank.

Referring again to FIG. 1b, the plastic deformation of the member 180 may be designed to occur at any given load level such as 192. As a result, therefore, of the composite assembly comprising the elastically deformable shock absorbing component 16 and the plastically deformable energy absorption member 180, the composite load compression graph thereof will be approximately as indicated at 188, 192 of FIG. 1b. That is to say, as the piston impacts the frame shoulder, the impact of the piston against the shoulder will at first be gradually absorbed by elastic deformation of the shock absorbing member 16 (and, of course, any elastic deformation of the "ring spring," or plastically deformable member 180 as does occur), along the line 188 of FIG. 1b, until a load corresponding to the level 192 is reached at which the elastic limit of member 180 will be exceeded whereupon additional load will be assumed by plastic deformation of the plastically deformable member 180 which holds the load substantially constant thereafter at the level 192 as shown in FIG. 1b.

It should be noted that in the ordinary usage of the tool the plastically deformable member 180 is not deformed beyond its elastic limit and that it is only in the event that the tool is operated without a workpiece in place that the stress applied to this ring is sufficient to plastically and permanently deform it. Under some conditions, it is desirable that such permanent deformation of the plastically deformable member 180 be indicated and disable the tool until such is replaced. This can be accomplished by providing that permanent deformation of the plastically deformable member 180 increases its diameter beyond the bore diameter of the barrel sleeve 5. In this condition, when an attempt is made to retract the piston to firing position, a margin of the plastically deformable member 180 will engage the end of the barrel sleeve 5, preventing complete retraction of the piston.

It should be stated, however, that while the buffer above described may comprise both an elastically deformable component 16 and a plastically deformable member 180, where space requirements permit, it is possible to so extend and enlarge the elastically deformable member 16, as to provide the energy absorption capacity needed for firing in the absence of a workpiece without the use of plastically deformable member 180.

While the elastically deformable component 16 is a buffer and preferably comprises layers of impregnated fabric alternating with metal shims, under some conditions it is possible to omit the shims and place successive layers of impregnated fabric in face-to-face relation. It is essential, however, that the buffer comprise a plurality of rings or disks of fibrous material held in an elastic impregnating medium, such that the transversely disposed elastic fibers and the elastic impregnant interact to oppose radial deformation while enabling the required longitudinal deformation.

Reverting to FIG. 1, the piston impact plate 184 is likewise preferably made of a malleable metal like aluminum or an aluminum alloy, having a compression strength substantially below that of the metal of the frame 1, which latter is made of steel. The purpose of this is to assure that the impact plate will fail through compression before the steel frame is broken under tension, this being an additional safety precaution in the piston construction. Moreover, the stress incident to stopping the piston assembly, either in normal usage or in firing without a workpiece, is received by the main frame barrel 2, and not by the work support 3, thus avoiding any bending stress in the curving connecting shank 3a.

Referring to FIGURES 1–3 and 5, the workpiece 58 in which a hole is to be punched is positioned in the hook-like retainer arm 3 of the tool frame against an annular shearing die 320 mounted in a bore 321 of the frame retainer or work support 3. The die 320 is resiliently held in place by means of a detent 322 which engages a peripheral groove 323 in the exterior surface of the die, this detent being backed by a small compression spring 324, for resilient displacement whereby the die 320 may be snapped into place or removed. Mounted on the piston 14 in the manner above described and integral with shank 18 is a plunger 325 of a diameter slightly less than that of the die aperture 326. The clearance between the punch and die is preferably somewhat greater than that commonly used in die sets operated by conventional means. The workpiece 58 to be punched such, for example, as the angle iron shown, is mounted on a supporting screw 328 which threads through the base of the frame retainer arm 3 as shown, this screw being adjustable up and down by means of the handle 329 secured to the base of the screw. Clamping device 57 clamps the workpiece securely against the die 320 during the punching operation. The suitable clamping device 57 which is shown consists of a pivotally mounted camming member 331 on the frame 1, which pivots thereon by means 330. Camming member 331 is provided with a lever arm 332 for manipulating. When the tool is fired the piston and tool assembly 16, including the plunger 325, advances from the firing position of FIGURE 1 to the punching position of FIGURE 3, thus to punch out a circular slug 333 from the workpiece 58 which drops down into a cavity 334 formed in the retainer arm 3 behind the die aperture 321.

It should be noted that the length of the cover 50 at its muzzle end 2b may be extended in length to partly, or completely cover the aperture at the top of retainer arm 3 to protect the operator from powder gases, chips, etc. when the tool is fired. This will depend largely on the size or shape of the work in which a hole is to be punched. In the case of an angle iron workpiece, as shown in FIGS. 1–3, extension of the cover may be neither practical nor necessary, the horizontally extending leg of the angle iron offering a measure of such protection.

As shown in FIGURES 1–4, and FIGURE 6, the tool is provided with a handle 200 of wood, hard rubber or equivalent, which is assembled on the under side of the tubular frame section 2 by means of bolts, as at 201, 202, threaded into the frame.

In assembling the tool from its components, the piston and tool assembly is first inserted in the frame barrel portion 2. The sleeve barrel 5 is thereupon inserted against the shoulder 4. The barrel plug 6 is then inserted in the breech end of the frame and the cartridge chamber plug 7 inserted in the aligned holes 8, 9, and rotated until the pin 12 of the barrel plug seats in the notch of the chamber plug. As thus positioned, the slot 70b, FIGURE 4, cut in the upper face of the chamber plug 7, is positioned to seat the ejector end 72 of the cartridge ejector 66.

The enlarged head of the barrel plug 6 assures that the proper end will be inserted in the frame barrel 2. The chamber plug cannot be inserted until the barrel plug has been rotatively positioned with its bore 8 in alignment with the frame bore 9. The chamber plug cannot be incorrectly inserted by reason of its enlarged head 10 which can seat properly in the barrel plug counterbore 11 only when the plug is inserted as shown in FIGURE 1.

With the aforesaid components thus assembled as shown in FIGURE 1, the cover 50 may then be slid into position on the frame, to effect which the piston return bolt 63 must first be removed. As the cover is advanced to the firing postion shown in FIGURE 1, the frame cover pin 61 engages the shoulder 60 of the insert member 38 thus to limit the forward displacement of the cover. The cross slide protective device 56 will fit into place in the cover cutout 125, FIGURES 1–4, its cross slide portion 106 engaging the cutout. The piston return bolt 63 is thereupon inserted and threaded into the cover 50. The tool is now ready for operation.

The method of operation is as follows: In loading the tool, the firing unit 55 is grasped with one hand and one of the fingers thereof used to shift the cross slide protective device 56 transversely to a cover releasing position. The firing unit 55 and cover can then be drawn back to the cartridge ejecting position, thus exposing the cartridge chamber 21 through the aperture 70 in the cross slide cover, into which a blank cartridge 22 is dropped. The bolt is then pushed forward, encasing the cartridge. The cross slide protective device 56 is then shifted to its firing position, locking the cover to the frame, whereupon the trigger 87 may be pulled to fire. Thereafter the cross slide protective device 56 is shifted to the cover releasing position, whereupon the cover can again be withdrawn to the cartridge ejecting position by grasping the breech bolt, the spent shell thus being ejected through the cross slide cover aperture or opening 70. The punched or swaged workpiece 58 can now be removed from the now open C of the frame retainer arm. In the case of hole punching, the punched slug 333 will have fallen out of the tool through slot 334. An absolute minimum of manual motion is thus entailed from start to finish.

A feature of the tool resides, as above noted, in the chambering of the cartridge at right angles to the motion of the piston as illustrated in FIGURE 1. There are a number of advantages in this feature. Since captive piston tools of the type shown generally have a barrel bore diameter considerably in excess of the cartridge diameter, the right angled chambering of the cartridge chamber facilitates the loading of the large diameter piston ahead of the relatively small shell, without necessity for providing a safe, foolproof joint at the front end of the tool for muzzle loading of the piston, such as would otherwise be necessary if the cartridge chamber were axially aligned with the piston at the breech end of the tool. Moreover, since the barrel bore is considerably larger than that of the shell, the total force of the piston in the barrel plug is many times that of a conventional firearm. The cylindrical cartridge chamber member, inserted at right angles to the piston axis, through the frame and barrel plug apertures, provides a massive locking pin which secures and resists this high total explosive force occurring in the barrel bore. Again a tool of the type shown, employing a captive piston which is not ejected from the tool, tends to accumulate more powder residue than occurs in a conventional firearm. The right angle cartridge chamber assembly provides a means of instantaneous takedown or disassembly in the manner above described so that all surfaces of the piston chamber and barrel bore can easily be cleaned with a brush. Also the right angled cartridge chamber assembly provides a tool of minimum length. A much greater length of tool would be required in a construction wherein the cartridge chamber is axially aligned with the barrel of the piston. A further advantage of this construction is that a cartridge chamber plug for handling cartridges of a given caliber can easily be replaced by other cartridge chamber plugs of similar construction adapted for the insertion of cartridges of larger caliber, by simply making the cartridge bore of the requisite diameter and offsetting the same from the centerline whereby any caliber rimfire cartridge can be employed without necessity for relocating the firing pin. Since the barrel plug and cartridge chamber plug assembly provide, upon removal, the only entry through which the piston and tool assembly can be inserted, this construction eliminates the necessity for safety interlocks that would otherwise be required if the piston and tool assembly were side or front loaded into the tool frame.

Referring to FIGURE 1, mention was made above of the fact that the terminal portion of the steel piston cap 19 is of considerably reduced diameter as compared to the bore of the sleeve barrel 5 and the piston 14, and that this reduced diameter terminus of the piston cap fits into a corresponding bore 20a in the forward end of the barrel plug 6 through which the explosion chamber 21 has access to the bore 20a through the apertures 23a, 23 in the cartridge chamber and barrel plug, respectively. The significance of this is that experimental tests have shown that with a barrel of relatively large bore, such as that of the barrel 5, the initial expansion volume for the burning powder from the cartridge 22 is provided at so great a rate, as the piston moves forward, that combustion of the powder is irregular. Powder of sufficiently fine granulation to be "quick enough" for a barrel of the relatively large bore of the barrel 5 is not commercially available and would be dangerous to handle industrially even if it were. The smaller diameter protuberance extending from the piston cap into the barrel plug bore 20a provides a smaller bore diameter during the period of powder burning as the piston initially moves forward, and a larger diameter bore during powder gas expansion, the latter as the piston cap protuberance moves out of the barrel plug cavity to permit expansion of the gases into the larger bore of the barrel 5. It will further be noted in this regard that this protuberance 20 on the piston cap is nevertheless of considerably larger bore than the diameter of the shell 22 itself, and thus provides an initially exposed effective piston area large enough to apply tremendous acceleration to the piston by the powder up to the time it is completely burned but at the same time, does not permit the powder to "snuff out" by the pressure drop that might otherwise occur if the explosion chamber bore 21 had access directly to the large bore of the barrel 5. With the arrangement shown, it is not until the powder is completely burned that the large bore of the barrel 5 is uncovered, so that the gas, expanding, can act on the larger piston area during the remainder of travel. A large diameter piston has the distinct advantage of providing maximum expansion volume for powder gas in a tool of minimum length, such as that shown. A tool of the relative dimensions shown having a bore of about 1" for the barrel 5 and an effective length of the frame barrel of about 1⅝" provides an explosion chamber which should be equivalent to a barrel of about 22" in length, provided the piston were of the same caliber as the shell.

Referring to FIGURES 2 and 3, the longitudinal slot of the frame in which the piston return bolt 63 is displaceable also provides a gas escape passage communicating at one end with the bore of barrel sleeve 5 and at its opposite end with the frame outlet or passage 25. This passage, as shown by the dashed line of arrows in FIGURES 2 and 3, leads the gases above and beyond the piston and deposits them against the workpiece clamped in the frame C arm as soon as the piston has passed out of the barrel sleeve 5. In this passage the gases expand so as to minimize the blast effect and by directing them against the workpiece, which may be substantially covered by the frame cover 50 during firing, protects the operator against them. By providing for escape of the gases in this way they have a "swept" or "aspirating" effect on the barrel residue. This is in contrast to expedients heretofore employed in certain captive piston type tools wherein no gas outlet passage is provided and in which the gases are caused to expand and cool in the barrel, with the result that such tools must be frequently cleaned.

Reference will now be had to FIGURES 12-14, inclusive, showing a modification of the invention adapted for the swaging of an electrical terminal onto the end of electrical cable or for joining two cable ends together by means of an interposed sleeve. Assembled on the piston 14, as above described, is a swaging head or plunger 340, having a knobbed head 341. Mounted in the retainer arm 3, is a backing plate 342, secured in place by means of a bolt 343 extending through a bore of the retainer arm 3 and threading into the backing plate. Assuming the tool is to be employed for swaging a terminus 344 onto the end of a cable section 345, the sleeved portion 346 of the terminal member is first assembled on the cable terminus 345, and the assembly then positioned against the backing plate 342, in the manner shown in FIGURE 12, and held in place in the action or firing position by a modified form of work clamping device 57. This form of clamping device, as shown, consists of a substantially inverted U-shaped clamping member 347, which spans the extended frame cover 50 and is secured thereto by means of a screw 348, this clamping member having depending arms as at 349 adapted to engage the front face of the workpiece assembly and hold it against the backing plate 342.

When the tool is fired the plunger 340 is advanced from the position of FIGURE 12 to that of FIGURE 13, whereby the knobbed head 341 of the plunger swages the sleeve portion of the terminal into snug engagement with the cable terminus 345 in the manner illustrated at 350, FIGURE 13. For joining together two cable terminals 351, 352, FIGURE 14, by means of an interposed sleeve member 353, the swaging operation above described is performed twice. That is to say, the sleeve 353 is first slipped onto the cable terminus 351 and the assembly mounted in the tool in the manner illustrated in FIGURE 12 and the tool fired. The second cable terminus 352 is thereupon inserted in the opposite end of the sleeve 353 and the assembly thereupon again mounted in the retainer arm in the manner shown in FIGURE 12 and the tool again fired. As a result of these two operations the sleeve 353 is swaged to the cable terminus 351 in the manner shown at 354 and to the cable terminus 352 in the manner shown at 355.

In FIGURES 12 and 13 it will be noted that the muzzle end of the cover 50 is extended in length so that when the cover is advanced to the firing position with respect to the tool frame, its forward end covers the open C aperture of the hook-like retainer arm 3. In addition, the depending arms 349 close the side apertures. Thus, the cover and clamping device when closed automatically and safely covers the region into which chips, scale, powder gas, etc. may be deposited, shielding the operator against the same.

Because the clamping device 57 as shown, is attached to the cover to engage the workpiece when the cover has been advanced to its firing position, the cover and clamping device insure that the conduit sleeve will be fully against the backing plate 342 when the tool is fired. To provide resilient clamping, imparting some "give" to the clamping device when drawn into place against the workpiece, a piece of rubber 356 or the like is interposed between the flat top portion of U-shaped member 347 and the surface of cover 50, as shown. The hole through the member 347 for the screw 348 should be made somewhat larger than the screw diameter for the purpose.

What is claimed is:

1. An explosively actuated punching tool comprising a frame including a barrel section having a breech end and a muzzle end, a piston slidable in said barrel section, closure means including a cartridge chamber at the breech end of said barrel section and having access thereto, piston retainer means integral with the muzzle end of said barrel section, an elongated rigid member attached at one of its ends to said piston to project therefrom towards said muzzle end of the barrel section, a punching instrumentality integral with the other end of said rigid member, and shock absorbing means mounted for movement on said rigid member between said piston and said punching instrumentality, said shock absorbing means comprising a stacked assembly of laminae of interlocked fibrous material impregnated with a resilient rubber-like polymer, whereby when said shock absorbing means engages said piston retainer means at the end of a piston working stroke the stacked assembly of impregnated fibrous material will dissipate a large part of the shock of the stopping of said piston, and an abutment means forward of said shock absorbing means for engagement with said retainer means.

2. An explosively actuated punching tool according to claim 1 wherein the elongated rigid member has disposed thereon a plastically deformable member disposed between said piston and said shock absorbing means.

3. A explosively actuated punching tool comprising a frame including a barrel section having a breech end and a muzzle end, a piston displaceable therein, closure means including a cartridge chamber at the breech end of said barrel section and having access thereto, piston retainer means integral with the muzzle end of said barrel section, a punching tool attached to said piston and projecting therefrom towards said muzzle end of the barrel section, and shock absorbing means mounted for movement on said punching tool and adapted to absorb energy resulting from impact of said shock absorbing means against said retainer means at the end of a working stroke of said piston, said shock absorbing means comprising elastically deformable and plastically deformable shock absorbing members disposed seriatim in the direction of said impact, said elastically deformable member comprising a stacked assembly of metal laminae interleaved with laminae of fabric woven material impregnated with a resilient rubber-like polymer, and said plastically deformable member comprising a relatively thick section of a malleable metal plastically deformable upon the energy absorption capacity of said elastically deformable member having been substantially reached.

4. An explosively actuated punching tool according to claim 3 wherein said punching tool is a cable swaging tool.

5. An explosively actuated punching tool comprising, a frame including a barrel section having a breech end and a muzzle end terminating at the muzzle end in a hook-like arm section, a piston displaceable in said barrel section, breech closure means for said barrel section including a cartridge chamber having access to said barrel section and accessible from said breech end, and retainer means for said piston at the muzzle end of said barrel section, a cover displaceable along said frame between a retracted position and an advanced position thereof with respect to said frame, said cover when positioned at said retracted position exposing said cartridge chamber and when positioned at said advanced position covering said cartridge chamber and the open aperture of said hook-like arm, means on said cover for clamping a workpiece in said hook-like arm and cooperating means of said hook-like arm for clamping said workpiece in position with said cover disposed at said advanced position, and a punching tool carried by said piston adapted to fabricate said work piece, and shock absorbing means mounted on said piston adapted to dissipate energy resulting from impact of said piston against said retainer means.

6. An explosively actuated tool according to claim 5 wherein said punching tool is a cable swaging tool.

7. An explosively actuated punching tool comprising, a frame including a barrel section having a breech end and a muzzle end and terminating at the muzzle end in a hook-like arm section, a piston displaceable in said barrel section, breech closure means for said barrel section including a cartridge chamber having access to said barrel section and accessible from said breech end, and retainer means for said piston at the muzzle end of said barrel section, a cover displaceable along said frame between a retracted position and an advanced position thereof with respect to said frame, said cover when positioned at said retracted position exposing said cartridge chamber and when positioned at said advanced position covering said cartridge chamber and the open aperture of said hook-like arm, means on said cover for clamping a work piece in said hook-like arm and cooperating means of said hook-like arm for clamping said work piece in position with said cover disposed at said advanced position, and a punching tool carried by said piston adapted to fabricate said work piece, and shock absorbing means mounted on said piston adapted to dissipate energy resulting from impact of said piston against said retainer means, said shock absorbing means comprising axially aligned elastically deformable and plastically deformable shock absorbing members, said plastically deformable shock absorbing member plastically deformable upon the energy absorption capacity of the elastically deformable shock absorbing member having been substantially reached.

8. An explosively actuated punching tool comprising a frame having guide means for mounting a piston displaceable therealong, a piston assembly comprising a punching tool integral with said piston and mounted in said guide means, means at one end of said frame for impelling said piston assembly along said guide means and an impact member integral with the opposite end of said frame for stopping said piston assembly, and elastically deformable shock absorbing means mounted on said piston having a compression modulus such as to decelerate said piston assembly without exceeding the strength of said piston assembly, said means being of laminated construction and comprising axially aligned and interleaved metal rings and rings of fibrous material impregnated with a resilient rubber-like polymer, said means being capable of supporting a compression load substantially equal to the strength of said tool.

9. An explosively actuated tool according to claim 8 wherein said punching tool is a cable swaging tool.

10. An explosively actuated punching tool comprising a frame having guide means for mounting a piston displaceable therealong, a piston assembly comprising a punching tool integral with said piston and mounted in said guide means, means at one end of said frame for impelling said piston assembly along said guide means and an impact member integral with the opposite end of said frame for stopping said piston assembly, elastically deformable shock absorbing means mounted on said piston having a compression modulus such as to decelerate said piston assembly without exceeding the strength of said piston assembly and tool, said means being of laminated construction and comprising axially aligned and interleaved metal rings and rings of fibrous material impregnated with a resilient rubber-like polymer, said means being capable of supporting a compression load substantially equal to the strength of said tool, and a plastically deformable shock absorbing member mounted on said piston assembly in axial alignment with said shock absorbing means, said member comprising a relatively thick ring of material having a compression strength substantially below the strength of said frame and piston assembly and plastically deformable upon the energy absorption capacity of said elastically deformable member having been substantially reached.

11. An explosively actuated punching tool according to claim 10 wherein said punching tool is a cable swaging tool.

12. An explosively actuated punching tool comprising a frame having guide means for mounting a piston displaceable therealong, a piston mounted in said guide means, said piston carrying a punching tool, means at one end of said frame for impelling said piston along said guide means, an impact member at the opposite end of said frame for arresting said piston, and shock absorbing and energy dissipating means on said piston comprising elastically deformable and plastically deformable members mounted in axial alignment, said elastically deformable member having a compression modulus such as to decelerate said piston without exceeding the tensile strength of said piston and tool and being of laminated construction consisting of axially aligned and interleaved steel rings and rings of woven nylon fabric impregnated with neoprene, and said plastically deformable member comprising a relatively thick ring of malleable metal having a compression strength substantially below the tensile strength of said frame and piston and plastically deformable upon the energy absorption capacity of said elastically deformable member having been substantially reached.

13. An explosively actuated punching tool comprising a frame including a barrel section having a breech end and a muzzle end, a piston slidable in said barrel section, closure means including a cartridge chamber at the breech end of said barrel section and having access thereto, piston retainer means integral with the muzzle end of said barrel section, an elongated rigid member attached at one of its ends to said piston to project therefrom towards said muzzle end of the barrel section, a punching instrumentality integral with the other end of said rigid member, and shock absorbing means mounted for movement on said rigid member between said piston and said punching instrumentality, said shock absorbing means comprising a stacked assembly of laminae of interlocked fibrous material impregnated with a resilient rubber-like polymer, whereby said shock absorbing means engages said piston retainer means at the end of a piston working stroke the stacked assembly of impregnated fibrous material will dissipate a large part of the shock of the stopping of said piston.

14. An explosively actuated tool according to claim 13 wherein said punching instrumentality is a cable swaging instrumentality.

15. An explosively actuated punching tool according to claim 13 wherein the elongated rigid member has disposed thereon a plastically deformable member disposed between said piston and said shock absorbing means.

16. An explosively actuated punching tool comprising a frame including a barrel section having a breech end and a muzzle end, a piston slidable in said barrel section, closure means including a cartridge chamber at the breech end of said barrel section and having access thereto, piston retainer means integral with the muzzle end of said barrel section, a punching tool carried by said piston, and shock absorbing means mounted for movement between said piston and said piston retainer means and in alignment association with said piston, said shock absorbing means comprising a stacked assembly of laminae of interlocked fibrous material impregnated with a resilient rubber-like polymer, whereby said piston at the end of a working stroke compresses said stacked assembly of impregnated fibrous material between said piston and said piston retainer means, said stacked assembly of impregnated fibrous material thereby dissipating a large part of the shock of the stopping of said piston.

17. An explosively actuated punching tool according to claim 16 wherein said punching tool is a cable swaging tool.

18. An explosively actuated punching tool comprising, a frame including a barrel section having a breech end and a muzzle end, a piston displaceable therein, closure means including a cartridge chamber at the breech end of said barrel section and having access thereto, piston retainer means integral with the muzzle end of said barrel section, a work tool attachment element attached to said piston and projecting therefrom towards said muzzle end of the barrel section, a punching tool carried by said attachment element, and shock absorbing means mounted for movement on said attachment element adapted to absorb energy resulting from impact of said shock absorbing means against said retainer means at the end of a working stroke of said piston, said shock absorbing means including an elastically deformable energy dissipating member comprising a stacked assembly of metal laminae interleaved with laminae of fabric woven material impregnated with a resilient rubber-like polymer.

19. An explosively actuated punching tool according to claim 18 wherein said punching tool is a cable swaging tool.

No references cited.